US012293062B2

United States Patent
Feng et al.

(10) Patent No.: US 12,293,062 B2
(45) Date of Patent: *May 6, 2025

(54) MUSIC SHARING METHOD AND APPARATUS, ELECTRONIC DEVICE, AND STORAGE MEDIUM

(71) Applicant: Beijing Bytedance Network Technology Co., Ltd., Beijing (CN)

(72) Inventors: Ruixin Feng, Beijing (CN); Chaopeng Liu, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/545,529

(22) Filed: Dec. 19, 2023

(65) Prior Publication Data

US 2024/0118795 A1    Apr. 11, 2024

Related U.S. Application Data

(63) Continuation of application No. 17/602,210, filed as application No. PCT/CN2021/100911 on Jun. 18, 2021, now Pat. No. 11,914,845.

(30) Foreign Application Priority Data

Mar. 26, 2021    (CN) .......................... 202110328428.9

(51) Int. Cl.
G06F 3/0484    (2022.01)
G06F 3/0483    (2013.01)
(Continued)

(52) U.S. Cl.
CPC .......... *G06F 3/0484* (2013.01); *G06F 3/0483* (2013.01); *G06F 9/451* (2018.02);
(Continued)

(58) Field of Classification Search
CPC ...... G06F 3/0484; G06F 3/0483; G06F 9/451; G06F 16/74; G06F 16/7867; G11B 27/02
See application file for complete search history.

(56) References Cited

U.S. PATENT DOCUMENTS

2003/0101364 A1    5/2003    Kim et al.
2013/0163963 A1    6/2013    Crosland et al.
(Continued)

FOREIGN PATENT DOCUMENTS

CN    103593142 A    2/2014
CN    106202103 A    12/2016
(Continued)

OTHER PUBLICATIONS

First Office Action issued Apr. 2, 2022 in Chinese Patent Application No. 202110328428.9 (10 pages) with an English translation (9 pages).
(Continued)

*Primary Examiner* — Daniel Samwel

(57) ABSTRACT

Embodiments of the present disclosure disclose a music sharing method, a system, an apparatus, an electronic device, and a storage medium. The method includes: displaying a lyric video template display interface associated with a target song when an instruction associated with lyric video template display is triggered; receiving a video editing operation performed by a user for a selected lyric video template on the lyric video template display interface, the lyric video template being generated based on at least one of lyrics of the target song, a segment of the target song, an effect of the lyrics, and a video background matching the target song or the lyrics; and generating a lyric video based on the video editing operation performed by the user for the selected lyric video template on the lyric video template display interface.

20 Claims, 8 Drawing Sheets

(51) Int. Cl.
*G06F 9/451* (2018.01)
*G06F 16/74* (2019.01)
*G06F 16/78* (2019.01)
*G11B 27/02* (2006.01)

(52) U.S. Cl.
CPC .......... *G06F 16/74* (2019.01); *G06F 16/7867* (2019.01); *G11B 27/02* (2013.01)

(56) References Cited

U.S. PATENT DOCUMENTS

| | | | |
|---|---|---|---|
| 2016/0378269 | A1 | 12/2016 | Conway et al. |
| 2018/0190253 | A1* | 7/2018 | O'Driscoll ......... H04N 21/4622 |
| 2018/0192108 | A1* | 7/2018 | Lyons .................... G06F 16/219 |
| 2018/0357548 | A1* | 12/2018 | Nichols .................... G06N 5/04 |
| 2018/0374461 | A1* | 12/2018 | Serletic ................ H04N 9/8211 |
| 2020/0184937 | A1 | 6/2020 | O'Driscoll et al. |
| 2020/0186489 | A1* | 6/2020 | Chen ................. G06F 16/24578 |
| 2022/0068314 | A1 | 3/2022 | Hu et al. |
| 2022/0310125 | A1 | 9/2022 | Sun et al. |

FOREIGN PATENT DOCUMENTS

| | | | | |
|---|---|---|---|---|
| CN | 107729522 | A | 2/2018 | |
| CN | 109144346 | A | 1/2019 | |
| CN | 109327608 | A | 2/2019 | |
| CN | 109451343 | A | 3/2019 | |
| CN | 109819270 | A | 5/2019 | |
| CN | 111935537 | A | 11/2020 | |
| CN | 111970571 | A | 11/2020 | |
| CN | 112423107 | A | 2/2021 | |
| EP | 3343484 | A1 | 7/2018 | |
| GB | 2440181 | A * | 1/2008 | ............. G06F 17/00 |
| WO | 2016/095072 | A1 | 6/2016 | |

OTHER PUBLICATIONS

The First office action dated Nov. 21, 2023 in Indonesian Application No. IDP00202108441(3 page), with an English translation (3 pages).
Second Office Action issued Aug. 22, 2022 in Chinese Patent Application No. 202110328428.9 (8 pages) with an English translation (10 pages).
Notification to Grant Patent Right for Invention issued Jan. 16, 2023 in Chinese Patent Application No. 202110328428.9, English translation (3 pages).
International Search Report issued Jan. 4, 2022 in PCT Appl. No. PCT/CN2021/100911, English translation (6 pages).
European Search Report for EP Patent Application No. 21932427.4, Issued on Mar. 19, 2024, 8 pages.
Communication Pursuant to Article 94(3) EPC for European Application No. 21932427.4, mailed Nov. 29, 2024, 5 Pages.

* cited by examiner

MUSIC SHARING METHOD AND APPARATUS, ELECTRONIC DEVICE, AND STORAGE MEDIUM

The present application is a continuation of U.S. patent application Ser. No. 17/602,210 filed Oct. 7, 2021 which is a 371 National Phase Application of International Application No. PCT/CN2021/100911 filed Jun. 18, 2021 which claims priority to Chinese Patent Application No. 202110328428.9, titled "MUSIC SHARING METHOD AND APPARATUS, ELECTRONIC DEVICE, AND STORAGE MEDIUM" filed with the China National Intellectual Property Administration on Mar. 26, 2021, the entire contents of which are incorporated herein by reference in their entirety.

TECHNICAL FIELD

Embodiments of the present disclosure relate to the field of computer technologies, and more particularly, to a music sharing method, a music sharing apparatus, an electronic device, and a storage medium.

BACKGROUND

Users of music digital streaming media products often hope to share music with groups and friends on their social media when listening to songs. Also, sharing is an effective social media promotion means, which is essential for the brand and the acquisition of new users.

Currently, the user sharing music refers to that the user, when having an interest in the current song, clicks on a share button on a player interface for song listening to share the song in a form of a music link to an off-site platform selected by the user. Such a music sharing method is monotonous, and cannot satisfy the requirements for sharing music-related active and rich emotional expression of the user.

SUMMARY

Embodiments of the present disclosure provide a music sharing method, a music sharing apparatus, an electronic device, and a storage medium, capable of enabling a user to share music in a form of lyric video, which enriches emotional expression and music sharing forms.

In a first aspect, an embodiment of the present disclosure provides a music sharing method, including: displaying a lyric video template display interface associated with a target song when an instruction associated with lyric video template display is triggered; receiving a video editing operation performed by a user for a selected lyric video template on the lyric video template display interface, wherein the lyric video template is generated based on at least one of lyrics of the target song, a segment of the target song, an effect of the lyrics, and a video background matching the target song or the lyrics, and the video editing operation for the selected lyric video template comprises at least one of music switching, video editing and effect switching; and generating a lyric video based on the video editing operation performed by the user for the selected lyric video template on the lyric video template display interface.

In a second aspect, an embodiment of the present disclosure further provides an electronic device. The electronic device includes one or more processors and a memory device having one or more programs stored thereon. The one or more programs, when executed by the one or more processors, cause the one or more processors to implement the music sharing method according to any of the embodiments of the present disclosure.

In a third aspect, an embodiment of the present disclosure further provides a storage medium including computer-executable instructions. The computer-executable instructions, when executed by a computer processor, implement the music sharing method according to any of the embodiments of the present disclosure.

BRIEF DESCRIPTION OF DRAWINGS

The above and other features, advantages, and aspects of embodiments of the present disclosure will become more apparent with reference to the accompanying drawings in conjunction with the following detailed implementations. Throughout the drawings, same or similar reference numbers represent same or similar elements. It should be understood that the drawings are illustrative, and elements and components are not necessarily drawn to scale.

DESCRIPTION OF EMBODIMENTS

Figure 1:
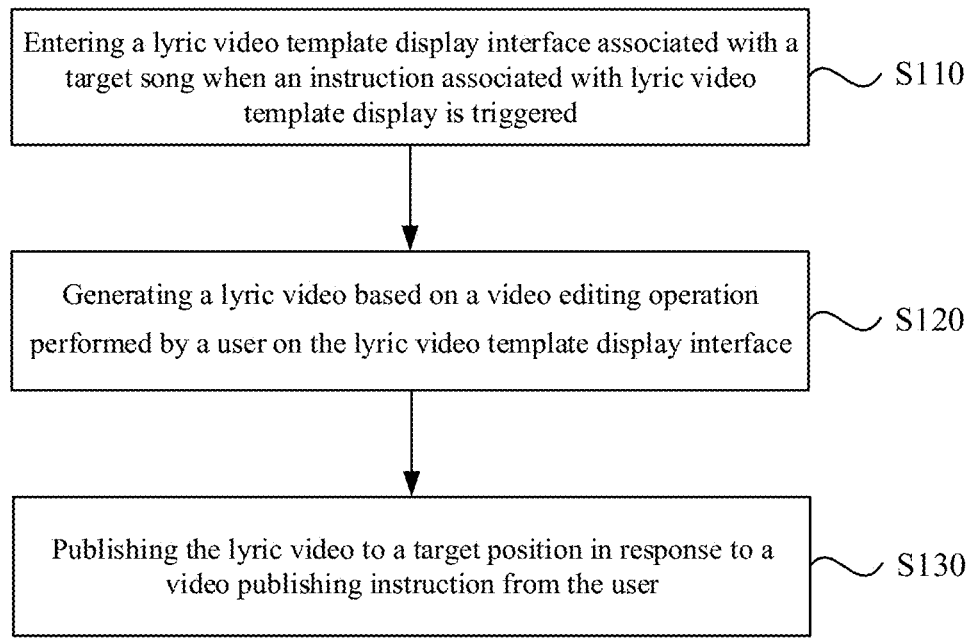
FIG. 1 is a flowchart illustrating a music sharing method according to Embodiment 1 of the present disclosure.

Embodiments of the present disclosure will be described in more detail below with reference to the accompanying drawings. While some embodiments of the present disclosure are illustrated in the drawings, it should be understood that the present disclosure may be embodied in various forms and should not be construed as being limited to the embodiments set forth herein. Instead, these embodiments are provided for a complete and thorough understanding of the present disclosure. It should be understood that the drawings and the embodiments of the present disclosure are for illustration purposes only and are not intended to limit the protection scope of the present disclosure.

It should be understood that various steps recited in embodiments of the method of the present disclosure may be performed in a different order, and/or performed in parallel. Moreover, the embodiments of the method may include additional steps and/or omit to perform the illustrated steps. The scope of the present disclosure is not limited in this respect.

The term "including" and variations thereof as used herein are open-ended, i.e., "including, but not limited to". The term "based on" means "based at least in part on". The term "one embodiment" means "at least one embodiment"; the term "another embodiment" means "at least one additional embodiment"; and the term "some embodiments" means "at least some embodiments". Relevant definitions for other terms will be given in the following description.

It should be noted that terms "first", "second", and the like in the present disclosure are only used for distinguishing different apparatuses, modules, or units, and are not used for limiting an order or interdependence of functions performed by the apparatuses, modules, or units.

It should be noted that the modification "a", "an", or "plurality of" in the present disclosure is illustrative rather than limiting, and shall be construed as "one or more" by those skilled in the art, unless clearly indicated otherwise.

Embodiment 1

FIG. 1 is a flowchart illustrating a music sharing method according to Embodiment 1 of the present disclosure. This embodiment of the present disclosure is applicable for music sharing situations, especially a situation in which music on a music playing platform is shared out of the music playing platform in a form of a video. The method can be performed by a music sharing apparatus, which can be implemented in a form of software and/or hardware. The apparatus can be configured in an electronic device, e.g., a mobile terminal.

As illustrated in FIG. 1, the music sharing method according to this embodiment includes the following steps.

In step S110, a lyric video template display interface associated with a target song is entered when an instruction associated with lyric video template display is triggered.

In an embodiment, when the music sharing instruction is triggered, the lyric video template display interface associated with the target song is displayed.

Specifically, the instruction associated with the lyric video template display includes a music sharing instruction and a lyric video editing instruction. Generally, when a music player plays music, a music player interface will display a sharing function control. When the sharing function control is triggered, the music sharing instruction may be triggered, and the player jumps and displays a music sharing interface for a user to select to share music from a music player client to a target social media client, and share the music in a form of a link, for example, sending a currently playing music from the music player to a social platform selected by the user.

In this embodiment of the present disclosure, when the music sharing instruction is triggered, the lyric video template display interface associated with the target song is entered. Thus, the user can select any lyric video template on the lyric video template display interface to display a content of the target song, and realize sharing the music in a form of a lyric video.

Figure 2:
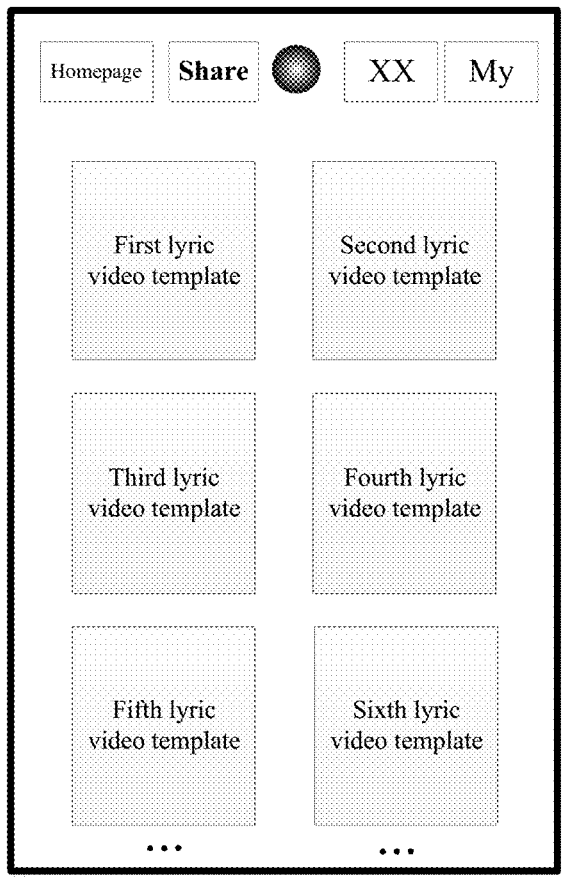
FIG. 2 is a schematic diagram showing a lyric video template display interface according to Embodiment 1 of the present disclosure.

Specifically, in some optional implementations, in addition to the sharing function control on the music player interface, the way of triggering the music sharing instruction may be setting a sharing tab associated with the lyric video template display in the music player. When the sharing tab is triggered, the music sharing instruction is triggered and linked to a display interface of a target lyric video template. The sharing tab is equivalent to a display interface navigation tab in a client interface of the music player. After the sharing tab is triggered, the lyric video template display interface is directly entered, which is equivalent to entering a lyric video template square associated with the target song. For example, reference may be made to the schematic diagram of a player interface illustrated in FIG. 2. In FIG. 2, an upper part of the client interface of the music player (or a lower part of the interface or other suitable positions) is provided with an interface navigation tab bar, which includes page tabs such as homepage, sharing, music playing interface (a round tab in the middle), an arbitrary function page tab (XX), personal settings, etc. Here, the arbitrary function page tab (XX) refers to different navigation tabs in different music players, such as focus-on-musician interface, favorite playlist interface, and navigation tabs of other classifications. The sharing tab displayed in an enlarged bold font indicates that a current display interface of the music player is a display interface corresponding to the sharing tab. The lyric video template related to the target song is displayed on the lyric video template display interface.

In an implementation, a video production (editing) function control or a video production (editing) interface navigation tab may also be set in an interface of the music player. The video production control or tab is associated with the lyric video template display. When the video production control or tab is triggered, the music player client can obtain a video editing instruction and enter the lyric video template display interface associated with the target music.

It can be understood that, whether music is currently playing or not, when the user triggers the sharing tab, the video editing control, or the video editing tab in any manner, the lyric video template related to the target song will be displayed. When music is playing, the target song is a currently playing music. If no music is currently playing, the target music is music determined based on a predetermined song recommendation strategy. For example, the target song is determined based on genres and playing frequency of music the user has listened to in the past three days.

Further, the lyric video template is a video template synthesized based on elements such as lyrics, a music fragment, special effects of the lyrics, and a video background of the target song, or a lyric video of the same music that has been shared, or other videos.

In an embodiment, the lyric video template is generated based on at least one of lyrics of the target song, a segment of the target song, an effect of the lyrics, and a video background matching the target song or the lyrics.

In some optional implementations, if music is currently playing, and an interface displayed by the music player is the music playing interface (the round tab in the middle), the music sharing instruction can also be triggered by swiping to the right or other predetermined gestures to enter the lyric video template display interface.

In step S120, a lyric video is generated based on a video editing operation performed by a user on the lyric video template display interface.

In an embodiment, the video editing operation for the selected lyric video template includes at least one of music switching, video editing and effect switching.

Figure 3:
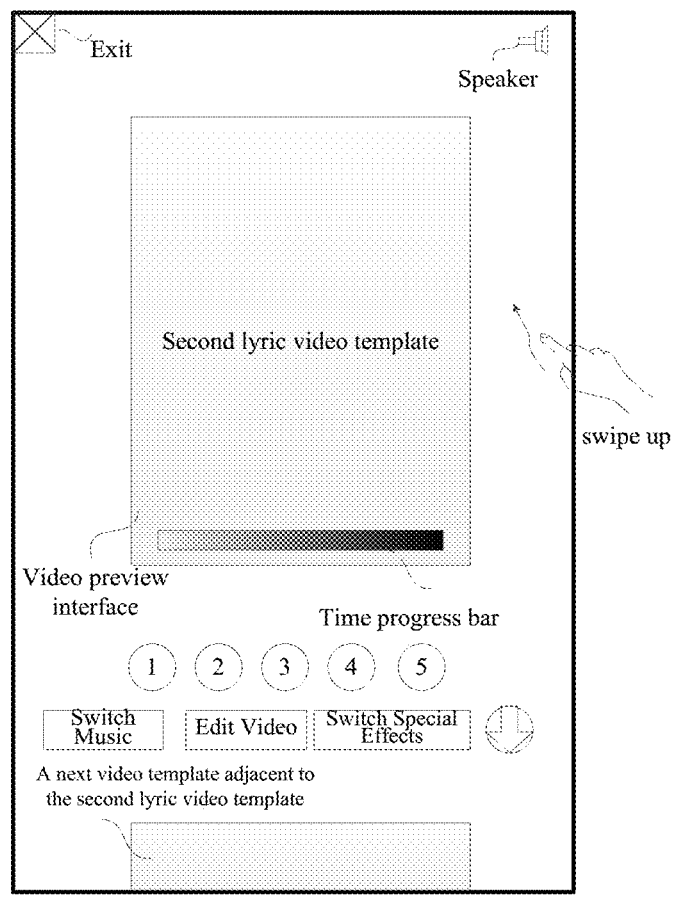
FIG. 3 is a schematic diagram showing a lyric video editing interface according to Embodiment 1 of the present disclosure.

In this embodiment of the present disclosure, after the lyric video template display interface is entered, the user can select any template as the target lyric video template, and then a lyric video editing interface is entered. For example, a second lyric video template is selected from an interface illustrated in FIG. 2, and then a display interface illustrated in FIG. 3 is entered. In FIG. 3, a video preview interface of the second lyric video template occupies a main display region of the display interface. Further, a time progress bar is set in the video preview interface to display a playback progress of a current video. Functional controls for video editing are provided below the video preview interface, such as Switch Music, which can refer to switching the target song, or switching to a different music segment of the target song; Edit Video, e.g., editing a video length, and adding contents such as characters and cartoon stickers to the video; and Switch Special Effects, which can refer to changing a display effect of lyrics in the video, such as fonts, font sizes, character colors, display positions, a dynamic display mode, and other special effects. A down arrow on the right side of the Switch Special Effects control is a download control, which can save the well edited lyric video to a memory space of a terminal with the music player.

When the user swipes upwards through a gesture, the current second lyric video template is switched to a next lyric video template adjacent to the current second lyric video template in order.

In FIG. 3, circular controls marked with numbers are off-site platforms to which the lyric video can be shared. In addition, the interface illustrated in FIG. 3 also contains controls such as Exit and Speaker. Here, other functional controls are not excluded, and some functional controls can be selectively displayed or hidden based on the user's personalized settings.

In an embodiment, the method may further include step S130, at which the lyric video is published to a target position in response to a video publishing instruction from the user.

For example, the lyric video is sent to a target sharing position in response to a video sharing instruction from the user.

When any of the circular controls marked with a number in FIG. 3 is selected by the user, the completely edited lyric video can be shared or published to an off-site social platform to which the circular control can be linked, such that the user can interact with others directly in a form of video. Therefore, when the user shares a video edited by himself/herself, not only the mood of the user at the time of listening to the music is shared, but also more new users can be attracted to the music platform.

In some embodiments, when the user edits the lyric video completely, the user can preview the lyric video, save the lyric video locally, and of course, choose to share or not share the lyric video.

With the technical solutions according to the embodiments of the present disclosure, the instruction associated with the lyric video template display, e.g., the music sharing instruction or the video editing instruction, can be triggered by triggering the sharing tab or by a predetermined gesture to enter the lyric video template display interface associated with the target song, instead of directly entering a selection interface of the sharing target position. The user can browse the lyric video template display interface, select the corresponding lyric video template from the lyric video template display interface, and edit the lyric video. The lyric video is generated based on the video editing operation performed by the user on the lyric video template display interface. The completely edited lyric video is directly published to the target position. This solution solves a problem in the related art that the music sharing mode and scenario are monotonous and cannot satisfy requirements of sharing music-related active and rich emotional expression of the user, such that the user can fully express current emotional dynamics and contents related to songs, and sharing forms and scenarios of songs are enriched.

Embodiment 2

This embodiment of the present disclosure can be combined with various optional schemes in the music sharing method according to the above-mentioned embodiment. The music sharing method according to this embodiment provides a way to display a music video when the instruction associated with the lyric video template display is not triggered, and encourages the user to edit videos for music sharing.

Figure 4:
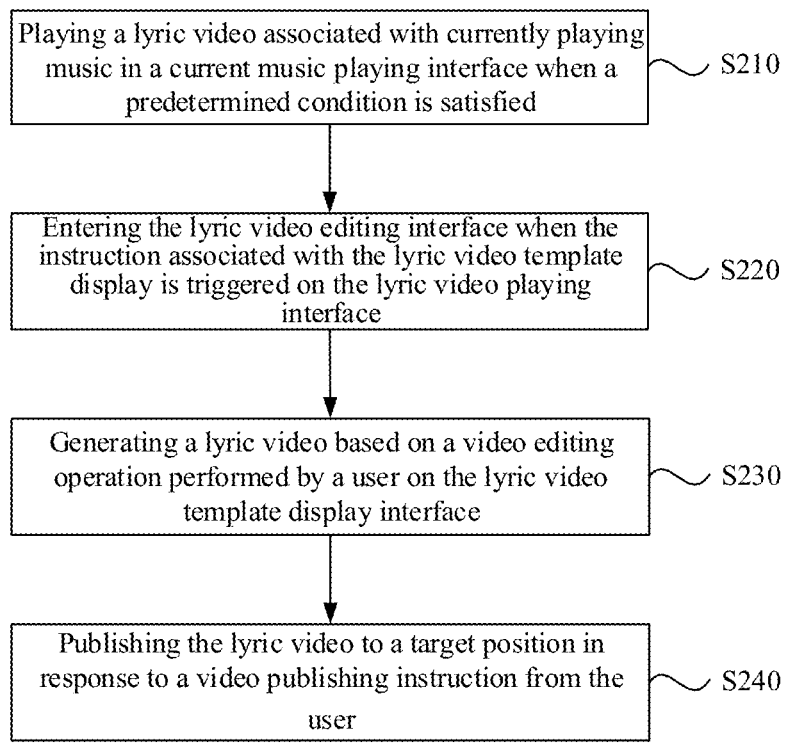
FIG. 4 is a flowchart illustrating a music sharing method according to Embodiment 2 of the present disclosure.

FIG. 4 is a flowchart illustrating a music sharing method according to Embodiment 2 of the present disclosure. As illustrated in FIG. 4, the music sharing method according to this embodiment includes the following steps.

In step S210, a lyric video associated with currently playing music is played in a current music playing interface when a predetermined condition is satisfied.

Figure 5:
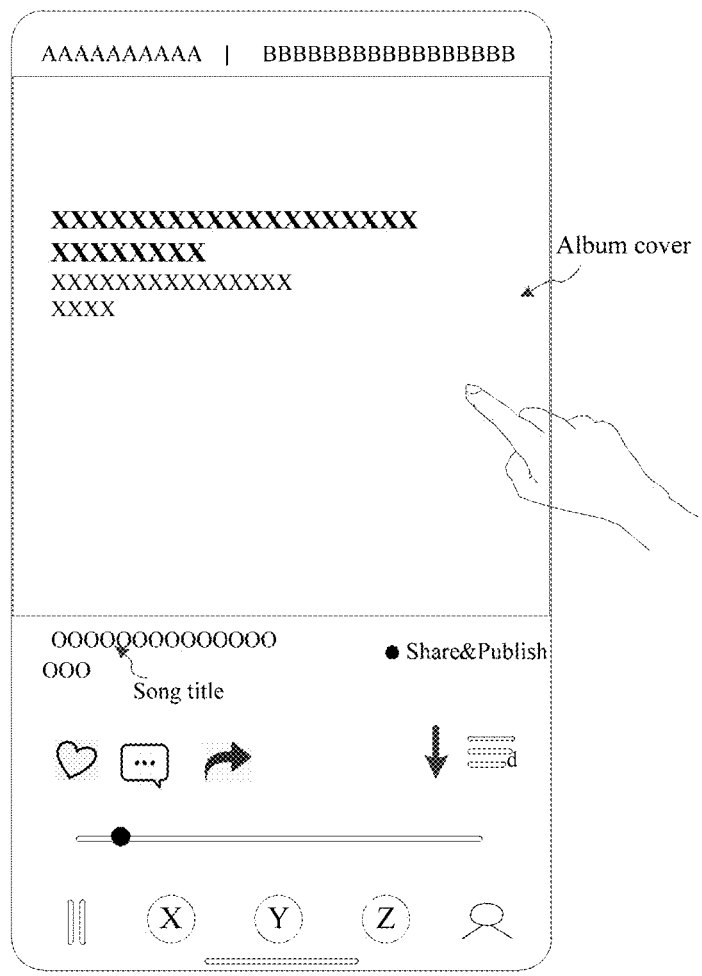
FIG. 5 is a schematic diagram showing a current music playing interface according to Embodiment 2 of the present disclosure.

Generally, when the terminal displays the current music playing interface of the music player, real-time scrolling lyrics and an album cover will be displayed. For example, reference can be made to the display interface illustrated in FIG. 5 for the current music playing interface. In FIG. 5, "A . . . " and "B . . . " displayed at the top of the interface represent a source playlist of the currently playing song and a content source of current interface display, respectively. That is, "A" represents a playlist name, e.g., a daily collection, a soprano collection or the like, and "B" represents that the playing content is a lyric content obtained based on the currently playing song. In FIG. 5, a background of the interface shows a cover of an album to which the currently playing song belongs, and lyrics "XXXX" are scrolling on the top of the cover, where the content displayed in a bold and enlarged font corresponds to a currently playing sentence of lyrics. In addition, below the album cover, a title of the currently playing song, Share&Publish, Favorite (a love heart-shaped control), Comment (a comment box), Forward (a right arrow), Download (a down arrow), Return to the playlist (a control on the right of the down arrow), Pause, a playback progress bar, Personal Center and other functional controls (X, Y, Z) are displayed. Here, it should be explained that the Share&Publish control is a sharing control that can trigger an entrance to the lyric video editing interface, and the Forward control is a commonly used sharing control for forwarding music links. Other functional controls (X, Y, Z) are functional controls that can be set as required, and different music players may have different functional controls.

Figure 6:
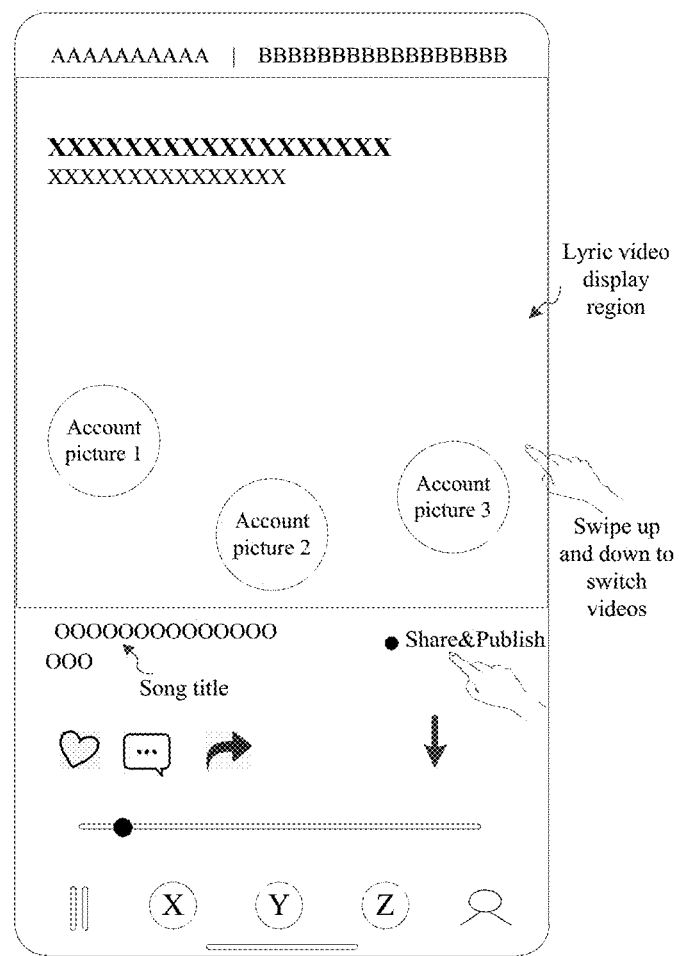
FIG. 6 is a schematic diagram showing a current music playing interface that is playing a lyric video according to Embodiment 2 of the present disclosure.

In this embodiment, when the user clicks on an arbitrary position of the album cover, or when a display duration of the album cover reaches a predetermined duration (for example, ten seconds), the predetermined condition is satisfied, and thus the current interface is automatically switched to the interface illustrated in FIG. 6, and the lyric video associated with the currently playing music starts to be played at the display position of the album cover in FIG. 5. A lyric video display region will also display a user account picture associated with a currently playing lyric video.

The lyric video is a video generated by editing lyrics of the currently playing music and a lyric video template to be displayed of the lyric video template display interface when the currently playing music is the target song, or the lyric video is a short video associated with the currently playing music in a digital media platform associated with a platform of the currently playing music. The lyric video may also include a lyric video of the song that has been edited by another user.

Preferably, the user, when swiping up and down in a video display region, can switch the lyric video. A switching order of lyric videos is consistent with an order of the lyric video templates to be displayed.

Figure 7:
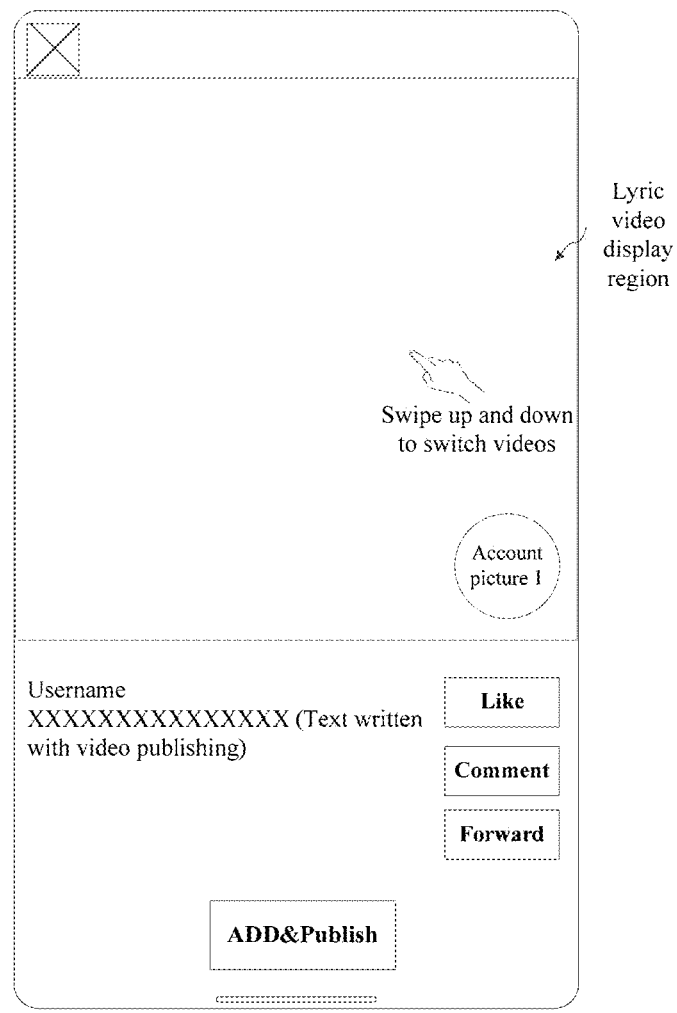
FIG. 7 is a schematic diagram showing a lyric video playing interface according to Embodiment 2 of the present disclosure.

In some applicable implementations, when the user clicks on an account picture displayed in the lyric video display region, the interface can also jump to a lyric video interface that has been published by a user corresponding to the account picture clicked by the user, e.g., an interface as illustrated in FIG. 7, to learn about a detailed content of the lyric video that has been published by the user corresponding to the account picture.

For example, in response to the user clicking on the account picture 1 in FIG. 6, the interface jumps to the interface in FIG. 7. In FIG. 7, the lyric video display region is an original video source of the currently playing lyric video or to-be-played lyric videos published by the user represented by the account picture 1. Below this interface, the username of the user represented by the account picture 1 and the text written when the lyric video displayed in the lyric video display region was published are displayed. In addition, controls such as Like, Comment, Forward, and Add&Publish. In response to the user performing a swiping operation in the lyric video display region illustrated in FIG. 7, the video content can also be switched, e.g., artist-related contents of the currently playing song, a Music Video (MV) of the song, live concert videos, lyric videos synchronized to contents created by users, cover versions on other short video platforms, and other related music videos. If the user feels touched when switching to a certain video and wants to comment and share, the user can click the Add&Publish control in the current interface.

In step S220, the lyric video editing interface is entered when the instruction associated with the lyric video template display is triggered on the lyric video playing interface.

Figure 8:
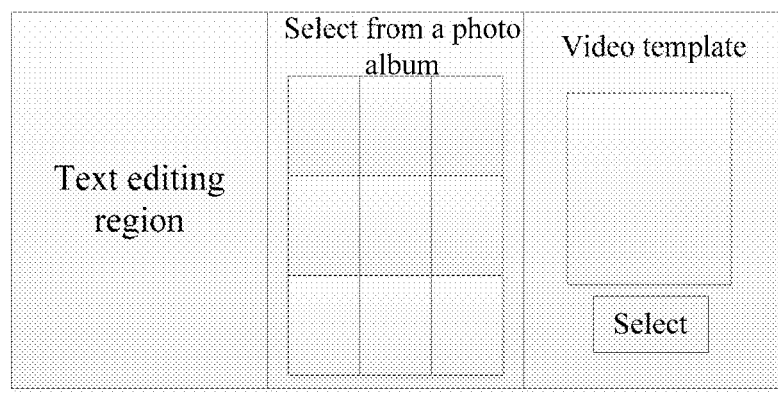
FIG. 8 is a schematic diagram showing a lyric video editor according to Embodiment 2 of the present disclosure.

If the user wants to share and publish the lyric video to his/her personal social platform account while listening to music and watching the lyric video, the user can click the Share&Publish control in FIG. 5 or FIG. 6 or the Add&Publish control in FIG. 7, so that a lyric video publishing editing interface as illustrated in FIG. 8 will appear on the display interface. Or, when the user only wants to make a lyric video by himself/herself, he/she can click on the video production control or navigation tab on the display interface of the player (not illustrated in the figures, and corresponding function modules can be set based on an actual interface layout) to enter the lyric video editing interface.

The editing interface includes editing interfaces such as a text editing region, an image selection region, and a selection region for lyric video templates synchronized to contents. Here, the text editing region can include a keyboard for inputting the text and a display region for the text that have been input; the image selection region can customize a range for an image selection, which can be a photo album of the terminal or any image libraries on the Internet, and after the range for the image selection is selected, images in the selected range will be displayed in a form of a list; and the selection region for the lyric video templates synchronized to contents provides music video templates of different durations for selection. In addition, although not shown in the figure, editing controls such as lyric effects or sticker effects in the video can also be included.

In step S230, a lyric video is generated based on a video editing operation performed by a user on the lyric video template display interface.

In step S240, the lyric video is published to a target position in response to a video publishing instruction from the user.

With the technical solution according to this embodiment of the present disclosure, before the music sharing instruction is triggered, the lyric video associated with the currently playing music is automatically displayed, and the user is attracted to create, edit, and share his/her own lyric video. After the music sharing instruction is triggered, a lyric video template display and editing interface is entered, instead of directly entering the selection interface for the sharing target position. The user can browse the lyric video template display interface, select the corresponding lyric video template from the lyric video template display interface, and edit the lyric video. The lyric video is generated based on the video editing operation performed by the user on the lyric video template display interface. Finally, the completely edited lyric video is directly published to the target position. This solution allows the user to fully express current emotional dynamics and contents related to song, and enrich sharing forms and scenarios of songs.

Embodiment 3

This embodiment of the present disclosure can be combined with various optional schemes in the music sharing method according to the above-mentioned embodiments. The music sharing method according to this embodiment further explains steps about how to determine the target song when no song is currently playing, so as to provide the user with lyric video templates for music sharing.

Figure 9:
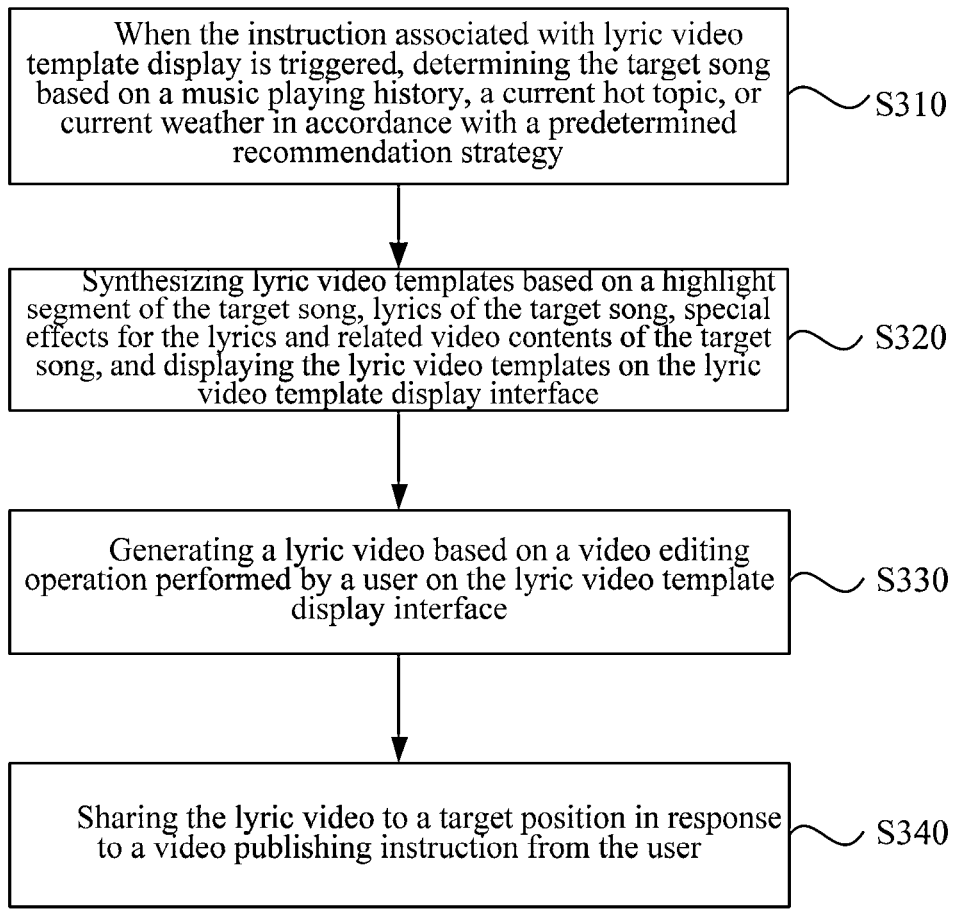
FIG. 9 is a flowchart illustrating a music sharing method according to Embodiment 3 of the present disclosure.

FIG. 9 is a flowchart illustrating a music sharing method according to Embodiment 3 of the present disclosure. As illustrated in FIG. 9, the music sharing method according to this embodiment includes the following steps.

In step S310, when an instruction associated with lyric video template display is triggered, a target song is determined based on a music playing history, a current hot topic, or current weather in accordance with a predetermined recommendation strategy.

In this embodiment, the instruction associated with the lyric video template display may be obtained in response to monitoring that the music sharing tab or the video editing tab (control) in the interface navigation tabs is triggered. However, since no song is currently playing, it is necessary to determine a song as the target song.

In this embodiment, the target song can be determined based on the music playing history, the current hot topic, or the current weather in accordance with the predetermined recommendation strategy.

For example, the target song may be determined based on categories and frequency of songs that the user listens to in a predetermined time period, and the song with the highest playing counts or the highest favorite counts under classifications of lyrics that the user likes to listen to can be used as the target song. Or the song ranked first on the top charts is used as the target song. Or, when the current weather is rainy, a song related to a "rainy day" can be selected as the target song.

S320, lyric video templates are synthesized based on a highlight segment of the target song, lyrics of the target song, special effects for the lyrics and related video contents of the target song, and the lyric video templates are displayed on the lyric video template display interface.

In this embodiment, after the target song is determined, a content of at least one of a highlight segment of the target song, lyrics of the target song, special effects of the lyrics, or a video background matching the target song or the lyrics can be obtained from a database corresponding to the music player. Then, a plurality of lyric video templates is synthesized based on the obtained content, and the plurality of lyric video templates is displayed on the lyric video template display interface. Here, the highlight segment of the target song may include a chorus segment of the target song and a representative song segment that is broadly sung.

Preferably, before the plurality of lyric video templates is displayed on the lyric video template display interface, sharing probabilities of the plurality of lyric video templates can be determined based on information such as the style and color characteristics of the shared lyric video. The plurality of lyric video templates is ranked based on numerical values of the sharing probabilities. The plurality of lyric video templates is displayed in accordance with the ranking.

In step S330, a lyric video is generated based on a video editing operation performed by a user on the lyric video template display interface.

In step S340, the lyric video is published to a target position in response to a video publishing instruction from the user.

With the technical solution according to this embodiment of the present disclosure, when no music is currently playing but the music sharing instruction is triggered, the target song is first determined based on music playing historical data, the current hot topic, or the current weather in accordance with the predetermined recommendation strategy. Then, the lyric video associated with the target song is synthesized, and the lyric video template display interface is entered, instead of directly entering the selection interface of the sharing target position. Accordingly, the user can browse the lyric video template display interface, select the corresponding lyric video template from the lyric video template display interface, and edit the lyric video. The lyric video is generated based on the video editing operation performed by the user on the lyric video template display interface. The completely edited lyric video is directly published to the target position. The solutions allow the user to fully express current emotional dynamics and contents related to songs, and enrich sharing forms and scenarios of songs.

The music sharing method according to this embodiment of the present disclosure and the music sharing method according to the above-mentioned embodiments belong to the same idea. For technical details not described in this embodiment in detail, reference may be made to the above-mentioned embodiments. Same technical features have same beneficial effects in this embodiment and the above-mentioned embodiments.

Embodiment 4

Figure 10:
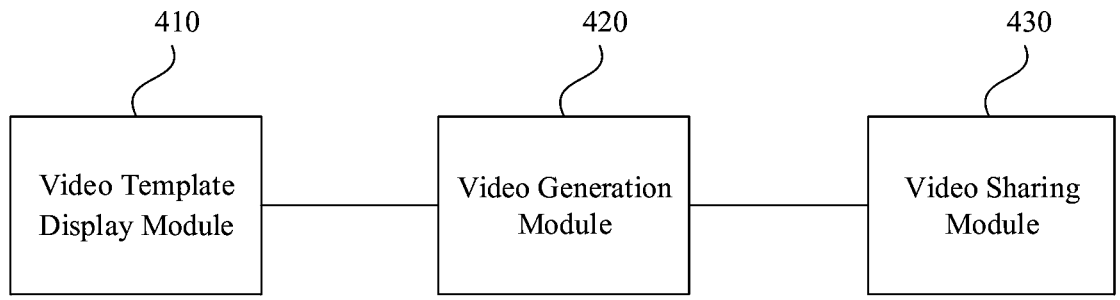
FIG. 10 is a schematic diagram showing a structure of a music sharing apparatus according to Embodiment 4 of the present disclosure.

FIG. 10 is a schematic diagram showing a structure of a music sharing apparatus according to Embodiment 4 of the present disclosure. The music sharing apparatus according to this embodiment is applicable for music sharing situations, especially a situation in which music on a music playing platform is shared out of the music playing platform in a form of a video.

As illustrated in FIG. 10, the music sharing apparatus includes a video template display module 410, a video generation module 420, and a video sharing module 430.

The video template display module 410 is configured to enter a lyric video template display interface associated with a target song when an instruction associated with lyric video template display is triggered. The video generation module 420 is configured to generate a lyric video based on a video editing operation performed by a user on the lyric video template display interface. The video sharing module 430 is configured to publish the lyric video to a target position in response to a video publishing instruction from the user.

With the technical solution according to this embodiment of the present disclosure, when the instruction associated with the lyric video template display is triggered, the lyric video template display interface associated with the target song is entered, instead of directly entering the selection interface of the sharing target position. Accordingly, the user can browse the lyric video template display interface, select the lyric video template from the lyric video template display interface, and edit the lyric video. The lyric video is generated based on the video editing operation performed by the user on the lyric video template display interface. The completely edited lyric video is directly published to the target position. The solution allows the user to fully express current emotional dynamics and contents related to songs, and enrich sharing forms and scenarios of songs.

In some optional implementations, the instruction associated with the lyric video template display includes a music sharing instruction and a lyric video editing instruction.

In some optional implementations, the video template display module 410 is further configured to, when a sharing function tab of a client interface is triggered, obtain the music sharing instruction and enter the lyric video template display interface associated with the target song.

In some optional implementations, the video template display module 410 is further configured to, when the target song is a currently playing song, in response to detecting a predetermined gesture associated with the lyric video template display interface in a music player interface, obtain the instruction associated with the lyric video template display, and enter a lyric video template display interface associated with the currently playing song.

In some optional implementations, the video template display module 410 is further configured to obtain a content of at least one of a highlight segment of the target song, lyrics of the target song, special effects of the lyrics, and a video background matching the target song or the lyrics; and synthesize a plurality of lyric video templates based on the obtained content, and display the plurality of lyric video templates on the lyric video template display interface.

In some optional implementations, the video template display module 410 is further configured to, prior to displaying the plurality of lyric video templates on the lyric video template display interface, determine sharing probabilities of the plurality of lyric video templates, and rank the plurality of lyric video templates based on numerical values of the sharing probabilities.

In some optional implementations, the music sharing apparatus further includes a video display module. The video display module is configured to, before the instruction associated with lyric video template display is triggered, play a lyric video associated with currently playing music in a current music playing interface when a predetermined condition is satisfied. The lyric video is a video generated by editing lyrics of the currently playing music and lyric video templates to be displayed of the lyric video template display interface when the currently playing music is the target song, or the lyric video is a short video associated with the currently playing music in a digital media platform associated with a platform of the currently playing music.

In some optional implementations, the music sharing apparatus further includes a target song determining module. The target song determining module is configured to, when no song is currently playing but the instruction associated with lyric video template display is triggered, determine the target song based on a music playing history, a current hot topic, or current weather in accordance with a predetermined recommendation strategy.

The music sharing apparatus according to the embodiments of the present disclosure can implement the music sharing method according to any embodiment of the present disclosure, and has corresponding functional modules and beneficial effects for implementing the method.

It is to be noted that units and modules included in the above apparatus are only divided based on functional logics, but are not limited to the above division, as long as corresponding functions can be realized. In addition, specific names of the functional units are simply used to facilitate distinguishing one from another, rather than to limit the protection scope of the embodiments of the present disclosure.

Embodiment 5

Figure 11:
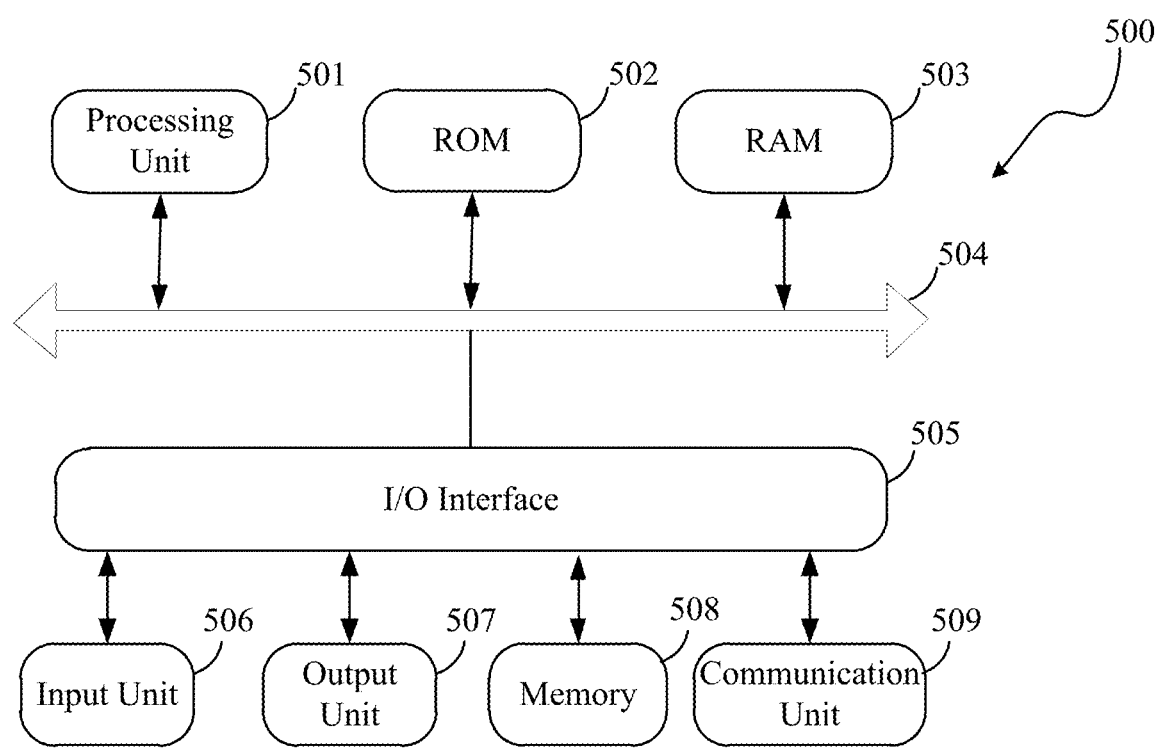
FIG. 11 is a schematic diagram showing a structure of an electronic device according to Embodiment 5 of the present disclosure.

Reference is now made to FIG. 11, which is a structural schematic diagram of an electronic device 500 (e.g., a terminal device or a server illustrated in FIG. 11) adapted to implement the embodiments of the present disclosure. The terminal device according to the embodiment of the present disclosure may include, but not limited to, mobile terminals such as a mobile phone, a laptop computer, a digital broadcast receiver, a Personal Digital Assistant (PDA), a tablet computer or PAD, a Portable Multimedia Player (PMP), and a in-vehicle terminal (e.g., an in-vehicle navigation terminal), and fixed terminals such as a digital TV and a desktop computer. The electronic device illustrated in FIG. 11 is exemplary only, and should not be construed as limiting the function and scope of use of the embodiments of the present disclosure.

As illustrated in FIG. 11, the electronic device 500 may include a processing unit 501 (e.g., a central processing unit, a graphics processor, etc.), which may perform various appropriate actions and processings in accordance with programs stored in a Read Only Memory (ROM) 502 or loaded from a storage unit 506 into a Random Access Memory (RAM) 503. Various programs and data required for operation of the electronic device 500 may also be stored on the RAM 503. The processing unit 501, the ROM 502, and the RAM 503 are connected to each other through a bus 504. An input/output (I/O) interface 505 is also connected to bus 504.

Generally, the following units may be connected to the I/O interface 505: an input unit 506 including, for example, a touch screen, a touch pad, a keyboard, a mouse, a camera, a microphone, an accelerometer, a gyroscope, etc.; an output unit 507 including, for example, a Liquid Crystal Display (LCD), a speaker, a vibrator, and the like; a memory 508 including, for example, magnetic tape, hard disk, etc.; and a communication unit 509. The communication unit 509 may allow the electronic device 500 to perform wireless or wired communication with other devices for data exchange. Although FIG. 11 illustrates the electronic device 500 having various units, it should be understood that it is not necessary to implement or provide all the illustrated units. Alternatively, more or fewer units may be implemented or provided.

In particular, according to an embodiment of the present disclosure, the processes described above with reference to the flowcharts may be implemented as computer software programs. For example, an embodiment of the present disclosure includes a computer program product, which includes a computer program carried on a non-transient computer-readable medium. The computer program includes program codes for implementing the method illustrated in any of the flowcharts. In these embodiments, the computer program may be downloaded and installed from a network through the communication unit 509, or installed from the memory 506, or installed from the ROM 502. The computer program, when executed by the processing unit 501, implements the above-mentioned functions defined in the music sharing method according to the embodiments of the present disclosure.

The electronic device according to this embodiment of the present disclosure and the music sharing method according to the above embodiments belong to the same idea. For technical details not described in this embodiment in detail, reference may be made to the above embodiments. This embodiment has the same beneficial effects as the above embodiments.

Embodiment 6

This embodiment of the present disclosure provides a computer storage medium. The computer storage medium has a computer program stored thereon. The computer program, when executed by a processor, implements the music sharing method according to the above embodiments.

It is to be noted that the above computer-readable medium in the present disclosure may be a computer-readable signal medium or a computer-readable storage medium or any combination thereof. The computer-readable storage medium may be, but not limited to, for example, an electrical, magnetic, optical, electromagnetic, infrared, or semiconductor system, apparatus, or device, or any combination thereof. More specific examples of the computer-readable storage medium may include, but not limited to: an electrical connection having one or more wires, a portable computer disk, a hard disk, a Random Access Memory (RAM), a Read Only Memory (ROM), an Erasable Programmable Read Only Memory (EPROM) or a flash memory, an optical fiber, a Compact Disc Read-Only Memory (CD-ROM), an optical memory device, a magnetic memory device, or any suitable combination thereof. In the present disclosure, the computer-readable storage medium may be any tangible medium including or storing programs, which may be used by or used with an instruction execution system, apparatus, or device. However, in the present disclosure, the computer-readable signal medium may include a data signal propagated in a baseband or as a part of a carrier that carries computer-readable program codes. Such propagated data signal may be in various forms, including but not limited to an electromagnetic signal, an optical signal, or any suitable combination thereof. The computer-readable signal medium may be any computer-readable medium other than the computer-readable storage medium, which may transmit, propagate, or transfer programs used by or used with an instruction execution system, apparatus or device. The program codes contained on the computer-readable medium may be transmitted via any appropriate medium, including but not limited to electric cable, optical cable, Radio Frequency (RF), or any suitable combination thereof.

In some embodiments, the client and the server may communicate using any currently known or future-developed network protocol, such as HTTP (HyperText Transfer Protocol), and may be in communication interconnection with digital data in any form or medium (e.g., a communication network). Examples of communication networks include a Local Area Network ("LAN"), a Wide Area Network ("WAN"), the Internet work (e.g., the Internet), and an end-to-end network (e.g., ad hoc end-to-end network), as well as any currently known or future-developed network.

The above-mentioned computer readable medium may be contained in the above-mentioned electronic device, or may be standalone without being assembled into the electronic device.

The above-mentioned computer readable medium carries one or more programs which, when executed by the electronic device, cause the electronic device to: enter a lyric video template display interface associated with a target song when an instruction associated with lyric video template display is triggered; generate a lyric video based on a video editing operation performed by a user on the lyric video template display interface; and publish the lyric video to a target position in response to a video publishing instruction from the user.

The computer program codes for implementing the operations of the present disclosure may be written in one or more programming languages or any combination thereof. The programming languages may include object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on the remote computer or server. In a case where the remote computer is involved, the remote computer may be connected to the user computer through any types of network, including a Local Area Network (LAN) or a Wide Area Network (WAN), or to an external computer (e.g., over the Internet by using an Internet service provider).

The flowcharts and block diagrams in the accompanying drawings illustrate architectures, functions, and operations of possible implementations of systems, methods, and computer program products according to various embodiments of the present disclosure. In this regard, each block in the flowcharts or block diagrams may represent a module, a program segment, or a part of codes. The module, program segment, or part of codes may contain one or more executable instructions for implementing a specified logical function. It should also be noted that, in some alternative implementations, the functions showed in blocks may occur in an order other than the order illustrated in the drawings. For example, two blocks illustrated in succession may actually be executed substantially in parallel with each other, or sometimes even in a reverse order, depending on functions involved. It should also be noted that each block in the block diagrams and/or flowcharts, or any combination of the blocks in the block diagrams and/or flowcharts, may be implemented using a dedicated hardware-based system configured to perform specified functions or operations or may be implemented using a combination of dedicated hardware and computer instructions.

The units described in the embodiments of the present disclosure may be embodied as software or hardware. Here, names of the units and modules do not constitute a limitation on the units or the modules under certain circumstances. For example, a data generation module can also be described as a "video data generation module".

The functions described herein above may be performed, at least in part, by one or more hardware logic components. For example, without limitation, exemplary types of suitable hardware logic components include a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

In the context of this disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of a machine-readable storage medium would include an electrical connection having one or more wires, a portable computer disk, a hard disk, a Random Access Memory (RAM), a Read Only Memory (ROM), an Erasable Programmable Read Only Memory (EPROM) or flash memory, an optical fiber, a Compact Disc Read Only Memory (CD-ROM), an optical memory device, a magnetic memory device, or any suitable combination thereof.

According to one or more embodiments of the present disclosure, [Example 1] provides a music sharing method. The method includes: entering a lyric video template display interface associated with a target song when an instruction associated with lyric video template display is triggered; generating a lyric video based on a video editing operation performed by a user on the lyric video template display interface; and publishing the lyric video to a target position in response to a video publishing instruction from the user.

According to one or more embodiments of the present disclosure, [Example 2] provides a music sharing method. The method further includes that the instruction associated with the lyric video template display includes a music sharing instruction and a lyric video editing instruction.

According to one or more embodiments of the present disclosure, [Example 3] provides a music sharing method. The method further includes that, said entering the lyric video template display interface associated with the target song when the instruction associated with the lyric video template display is triggered includes, when a sharing function tab of a client interface is triggered, obtaining the music sharing instruction and entering the lyric video template display interface associated with the target song.

According to one or more embodiments of the present disclosure, [Example 4] provides a music sharing method. In some optional implementations of the method, when the target song is a currently playing song, said entering the lyric video template display interface associated with the target song when the instruction associated with the lyric video template display is triggered includes, in response to detecting a predetermined gesture associated with the lyric video template display interface in a music player interface, obtaining the instruction associated with the lyric video template display, and entering a lyric video template display interface associated with the currently playing song.

According to one or more embodiments of the present disclosure, [Example 5] provides a music sharing method. In some optional implementations of the method, said entering the lyric video template display interface associated with the target song includes: obtaining a content of at least one of a highlight segment of the target song, lyrics of the target song, special effects of the lyrics, and a video background matching the target song or the lyrics; and synthesizing a plurality of lyric video templates based on the obtained content, and displaying the plurality of lyric video templates on the lyric video template display interface.

According to one or more embodiments of the present disclosure, [Example 6] provides a music sharing method. In some optional implementations, the method further includes, prior to displaying the plurality of lyric video templates on the lyric video template display interface: determining sharing probabilities of the plurality of lyric video templates; and ranking the plurality of lyric video templates based on numerical values of the sharing probabilities.

According to one or more embodiments of the present disclosure, [Example 7] provides a music sharing method. In some optional implementations, the method further includes, before the instruction associated with lyric video template display is triggered, playing a lyric video associated with currently playing music in a current music playing interface when a predetermined condition is satisfied. The lyric video is a video generated by editing lyrics of the currently playing music and lyric video templates to be displayed of the lyric video template display interface when the currently playing music is the target song, or the lyric video is a short video associated with the currently playing music in a digital media platform associated with a platform of the currently playing music.

According to one or more embodiments of the present disclosure, [Example 8] provides a music sharing method. In some optional implementations, the method further includes, when no song is currently playing but the instruction associated with lyric video template display is triggered, determining the target song based on a music playing history, a current hot topic, or current weather in accordance with a predetermined recommendation strategy.

According to one or more embodiments of the present disclosure, [Example 9] provides a music sharing apparatus, including: a video template display module configured to enter a lyric video template display interface associated with a target song when an instruction associated with lyric video template display is triggered; a video generation module configured to generate a lyric video based on a video editing operation performed by a user on the lyric video template display interface; and a video sharing module configured to publish the lyric video to a target position in response to a video publishing instruction from the user.

According to one or more embodiments of the present disclosure, [Example 10] provides a music sharing apparatus. In some optional implementations of the apparatus, the instruction associated with the lyric video template display includes a music sharing instruction and a lyric video editing instruction.

According to one or more embodiments of the present disclosure, [Example 11] provides a music sharing apparatus. In some optional implementations of the apparatus, the video template display module is further configured to, when a sharing function tab of a client interface is triggered, obtain the music sharing instruction and enter the lyric video template display interface associated with the target song.

According to one or more embodiments of the present disclosure, [Example 12] provides a music sharing apparatus. In some optional implementations of the apparatus, the video template display module is further configured to, when the target song is a currently playing song, in response to detecting a predetermined gesture associated with the lyric video template display interface in a music player interface, obtain the instruction associated with the lyric video template display, and enter a lyric video template display interface associated with the currently playing song.

According to one or more embodiments of the present disclosure, [Example 13] provides a music sharing apparatus. In some optional implementations of the apparatus, the video template display module is further configured to: obtain a content of at least one of a highlight segment of the target song, lyrics of the target song, special effects of the lyrics, and a video background matching the target song or the lyrics; and synthesize a plurality of lyric video templates based on the obtained content, and display the plurality of lyric video templates on the lyric video template display interface.

According to one or more embodiments of the present disclosure, [Example 14] provides a music sharing apparatus. In some optional implementations of the apparatus, the video template display module is further configured to, prior to displaying the plurality of lyric video templates on the lyric video template display interface, determine sharing probabilities of the plurality of lyric video templates; and rank the plurality of lyric video templates based on numerical values of the sharing probabilities.

According to one or more embodiments of the present disclosure, [Example 15] provides a music sharing apparatus. In some optional implementations, the music sharing apparatus further includes a video display module configured to, before the instruction associated with lyric video template display is triggered, play a lyric video associated with currently playing music in a current music playing interface when a predetermined condition is satisfied. The lyric video is a video generated by editing lyrics of the currently playing music and lyric video templates to be displayed of the lyric video template display interface when the currently playing music is the target song, or the lyric video is a short video associated with the currently playing music in a digital media platform associated with a platform of the currently playing music.

According to one or more embodiments of the present disclosure, [Example 16] provides a music sharing apparatus. In some optional implementations, the music sharing apparatus further includes a target song determining module configured to, when no song is currently playing but the instruction associated with lyric video template display is triggered, determine the target song based on a music playing history, a current hot topic, or current weather in accordance with a predetermined recommendation strategy.

The above description is only intended to explain the preferred embodiments of the present disclosure and the employed principles of the technology. It will be appreciated by those skilled in the art that the scope of the present disclosure herein is not limited to the technical solutions formed by the specific combination of the above technical features, but should also encompass any other combinations of features described above or equivalents thereof without departing from the above idea of the present disclosure. For example, the above features and the technical features disclosed in the present disclosure having similar functions (but not limited to them) are replaced with each other to form the technical solution.

Further, although the operations are depicted in a specific order, this should not be understood as requiring these operations to be performed in the specific order illustrated or in a sequential order. Under certain circumstances, multitasking and parallel processing may be advantageous. Likewise, although several specific implementation details are included in the above discussion, these should not be construed as limitations on the scope of the present disclosure. Certain features that are described in the context of separate embodiments can also be implemented in combination in a single embodiment. Conversely, various features described in the context of a single embodiment can also be implemented in multiple embodiments separately or in any suitable combination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. A music sharing method, comprising:
displaying a lyric video template display interface associated with a target song when an instruction associated with lyric video template display is triggered, wherein a plurality of lyric video templates are displayed on the lyric video template display interface for selection by a user, and each of the plurality of lyric video templates is synthesized from at least two media elements among lyrics of the target song, a segment of the target song, an effect of the lyrics, and a video background matching the target song or the lyrics;
receiving a video editing operation performed by the user for a selected lyric video template on the lyric video template display interface, wherein the video editing operation for the selected lyric video template comprises at least one of music switching, video editing and effect switching; and
generating a lyric video based on the video editing operation performed by the user for the selected lyric video template on the lyric video template display interface.

2. The method according to claim 1, wherein the instruction associated with the lyric video template display comprises a music sharing instruction and a lyric video editing instruction.

3. The method according to claim 2, wherein said displaying the lyric video template display interface associated with the target song when the instruction associated with the lyric video template display is triggered comprises:
when a sharing function tab of a client interface is triggered, obtaining the music sharing instruction and displaying the lyric video template display interface associated with the target song.

4. The method according to claim 1, wherein when the target song is a currently playing song, said displaying the lyric video template display interface associated with the target song when the instruction associated with the lyric video template display is triggered comprises:
in response to detecting a predetermined gesture associated with the lyric video template display interface in a music player interface, obtaining the instruction associated with the lyric video template display, and displaying a lyric video template display interface associated with the currently playing song.

5. The method according to claim 1, wherein said displaying the lyric video template display interface associated with the target song comprises:
obtaining a content of at least one of a segment of the target song, lyrics of the target song, an effect of the lyrics, and a video background matching the target song or the lyrics; and
generating a plurality of lyric video templates based on the obtained content, and displaying the plurality of lyric video templates on the lyric video template display interface.

6. The method according to claim 5, further comprising, prior to said displaying the plurality of lyric video templates on the lyric video template display interface:
determining sharing probabilities of the plurality of lyric video templates; and
ranking the plurality of lyric video templates based on numerical values of the sharing probabilities.

7. The method according to claim 1, further comprising, before the instruction associated with lyric video template display is triggered:
playing a second lyric video associated with currently playing music in a current music playing interface when a predetermined condition is satisfied, wherein the second lyric video is a video generated by editing lyrics of the currently playing music and lyric video templates to be displayed of the lyric video template display interface when the currently playing music is the target song, or the second lyric video is a short video associated with the currently playing music in a digital media platform associated with a platform of the currently playing music.

8. The method according to claim 1, further comprising, when no song is currently playing but the instruction associated with lyric video template display is triggered:
determining the target song based on a music playing history, a current hot topic, or current weather in accordance with a predetermined recommendation strategy.

9. An electronic device, comprising:
one or more processors; and
a memory having one or more programs stored thereon, wherein the one or more programs, when executed by the one or more processors, cause the one or more processors to implement a music sharing method comprising:
displaying a lyric video template display interface associated with a target song when an instruction associated with lyric video template display is triggered, wherein a plurality of lyric video templates are displayed on the lyric video template display interface for selection by a user, and each of the plurality of lyric video templates is synthesized from at least two media elements among lyrics of the target song, a segment of the target song, an effect of the lyrics, and a video background matching the target song or the lyrics;
receiving a video editing operation performed by the user for a selected lyric video template on the lyric video template display interface, wherein the video editing operation for the selected lyric video template comprises at least one of music switching, video editing and effect switching; and
generating a lyric video based on the video editing operation performed by the user for the selected lyric video template on the lyric video template display interface.

10. The electronic device according to claim 9, wherein the instruction associated with the lyric video template display comprises a music sharing instruction and a lyric video editing instruction.

11. The electronic device according to claim 10, wherein said displaying the lyric video template display interface associated with the target song when the instruction associated with the lyric video template display is triggered comprises:
when a sharing function tab of a client interface is triggered, obtaining the music sharing instruction and displaying the lyric video template display interface associated with the target song.

12. The electronic device according to claim 9, wherein when the target song is a currently playing song, said displaying the lyric video template display interface associated with the target song when the instruction associated with the lyric video template display is triggered comprises:
in response to detecting a predetermined gesture associated with the lyric video template display interface in a music player interface, obtaining the instruction associated with the lyric video template display, and displaying a lyric video template display interface associated with the currently playing song.

13. The electronic device according to claim 9, wherein said displaying the lyric video template display interface associated with the target song comprises:
obtaining a content of at least one of a segment of the target song, lyrics of the target song, an effect of the lyrics, and a video background matching the target song or the lyrics; and
generating a plurality of lyric video templates based on the obtained content, and displaying the plurality of lyric video templates on the lyric video template display interface.

14. The electronic device according to claim 13, further comprising, prior to said displaying the plurality of lyric video templates on the lyric video template display interface:
determining sharing probabilities of the plurality of lyric video templates; and
ranking the plurality of lyric video templates based on numerical values of the sharing probabilities.

15. The electronic device according to claim 9, further comprising, before the instruction associated with lyric video template display is triggered:
playing a second lyric video associated with currently playing music in a current music playing interface when a predetermined condition is satisfied, wherein the second lyric video is a video generated by editing lyrics of the currently playing music and lyric video templates to be displayed of the lyric video template display interface when the currently playing music is the target song, or the second lyric video is a short video associated with the currently playing music in a digital media platform associated with a platform of the currently playing music.

16. The electronic device according to claim 9, further comprising, when no song is currently playing but the instruction associated with lyric video template display is triggered:

determining the target song based on a music playing history, a current hot topic, or current weather in accordance with a predetermined recommendation strategy.

17. A non-transitory storage medium comprising computer-executable instructions, wherein the computer-executable instructions, when executed by a computer processor, implement a music sharing method comprising:
displaying a lyric video template display interface associated with a target song when an instruction associated with lyric video template display is triggered, wherein a plurality of lyric video templates are displayed on the lyric video template display interface for selection by a user, and each of the plurality of lyric video templates is synthesized from at least two media elements among lyrics of the target song, a segment of the target song, an effect of the lyrics, and a video background matching the target song or the lyrics;
receiving a video editing operation performed by the user for a selected lyric video template on the lyric video template display interface, wherein the video editing operation for the selected lyric video template comprises at least one of music switching, video editing and effect switching; and
generating a lyric video based on the video editing operation performed by the user for the selected lyric video template on the lyric video template display interface.

18. The non-transitory storage medium according to claim 17, wherein the instruction associated with the lyric video template display comprises a music sharing instruction and a lyric video editing instruction.

19. The non-transitory storage medium according to claim 18, wherein said displaying the lyric video template display interface associated with the target song when the instruction associated with the lyric video template display is triggered comprises:
when a sharing function tab of a client interface is triggered, obtaining the music sharing instruction and displaying the lyric video template display interface associated with the target song.

20. The non-transitory storage medium according to claim 17, wherein when the target song is a currently playing song, said displaying the lyric video template display interface associated with the target song when the instruction associated with the lyric video template display is triggered comprises:
in response to detecting a predetermined gesture associated with the lyric video template display interface in a music player interface, obtaining the instruction associated with the lyric video template display, and displaying a lyric video template display interface associated with the currently playing song.

* * * * *